United States Patent [19]
Zonka

[11] Patent Number: 5,683,096
[45] Date of Patent: Nov. 4, 1997

[54] URBAN AND ALL-TERRAIN STROLLER

[76] Inventor: Marco Zonka, 221 S. Sullivan, Spokane, Wash. 99037

[21] Appl. No.: 307,060

[22] Filed: Sep. 16, 1994

[51] Int. Cl.⁶ .................................................. B62B 7/10
[52] U.S. Cl. ......................... 280/642; 280/650; 280/62
[58] Field of Search ................................ 280/642, 644, 280/650, 658, 62

[56] References Cited

U.S. PATENT DOCUMENTS

| | | | |
|---|---|---|---|
| 861,203 | 7/1907 | Bull | 280/642 |
| 2,455,119 | 11/1948 | Hall | 280/644 |
| 2,685,325 | 8/1954 | Webster | 280/642 X |
| 4,953,880 | 9/1990 | Sudakoff et al. | 280/47.38 |
| 5,029,891 | 7/1991 | Jacobs | 280/650 |
| 5,076,599 | 12/1991 | Lockett et al. | 280/204 |
| 5,123,670 | 6/1992 | Chen | 280/650 |
| 5,176,395 | 1/1993 | Garforth-Bles | 280/415.1 |
| 5,188,389 | 2/1993 | Baechler et al. | 280/650 |
| 5,224,720 | 7/1993 | Chaw et al. | 280/62 |
| 5,299,825 | 4/1994 | Smith | 280/642 X |
| 5,356,171 | 10/1994 | Schmidlin et al. | 280/642 X |
| 5,370,408 | 12/1994 | Eagan | 280/642 X |
| 5,421,603 | 6/1995 | Wills et al. | 280/658 X |
| 5,447,323 | 9/1995 | Huang | 280/642 |

*Primary Examiner*—Brian L. Johnson
*Attorney, Agent, or Firm*—Wells, St. John, Roberts, Gregory & Matkin, P.S.

[57] ABSTRACT

An all-purpose/all-terrain tripodal stroller suitable for urban and rural or recreational and fitness related activities, including street strolling and shopping, or jogging and off-road hiking and strolling. An improved stroller chassis design with high ground clearance yet low center of gravity, maximizing collapsibility yet minimizing total size of vehicle envelope. When folding, the improved chassis allows the front wheel to pivot rearward until in alignment with both rear wheels, while the variable height steering handle folds down around central wheel. All pivot points engaged while collapsing are cantilevered out of plane with support members, which minimizes all scissoring and pinching actions between all framing members.

2 Claims, 5 Drawing Sheets

FIG. II

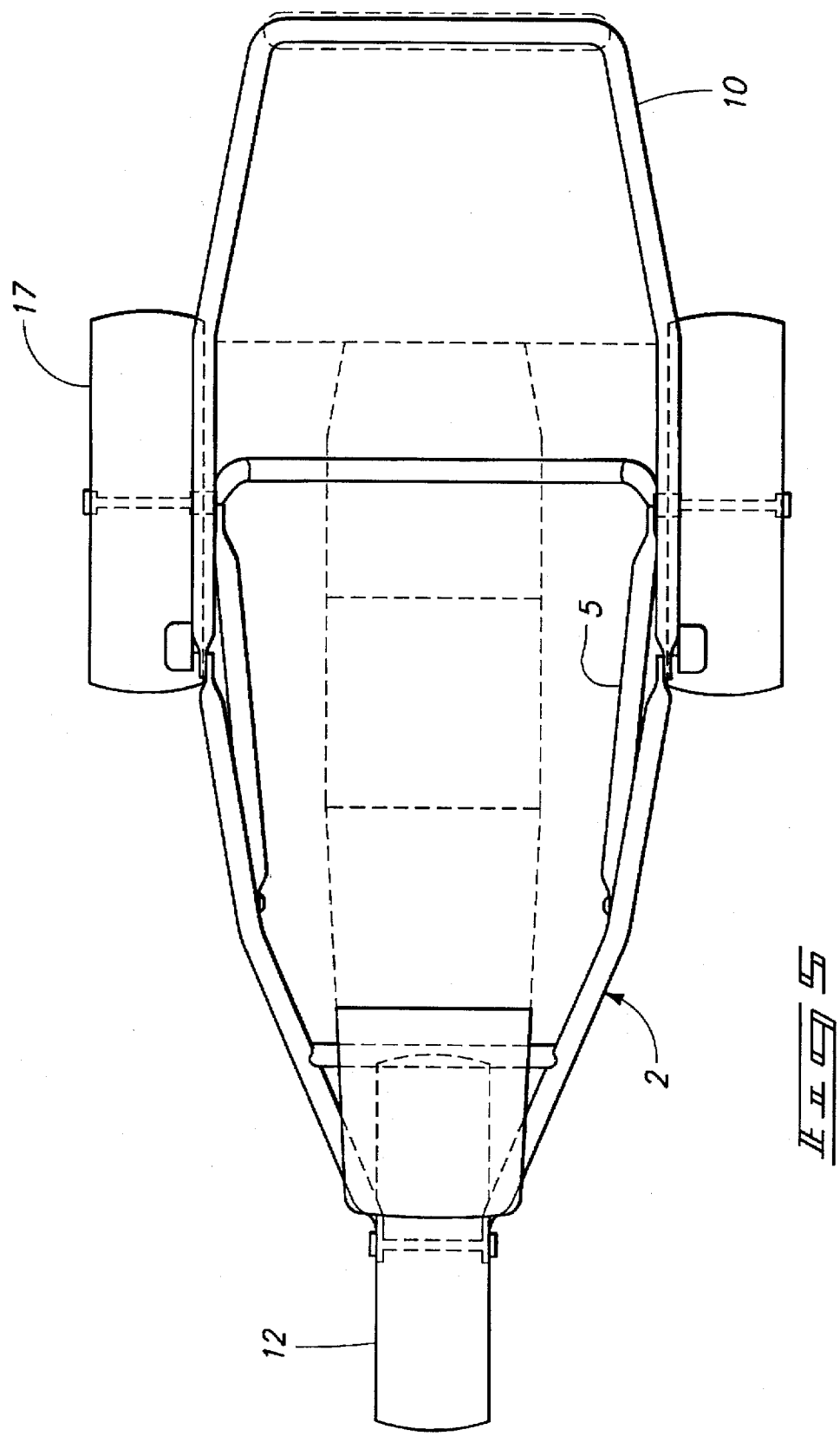

URBAN AND ALL-TERRAIN STROLLER

FIELD OF THE INVENTION

Over the last few years, several 3-wheeled strollers have entered the market claiming various "all-terrain" features and/or recreational and fitness related capabilities.

All of these designs benefit from the inherent stability of tripodal wheeled contact points over variable terrain. But several salient structural limitations common to all of them limits the quality and versatility of their performance.

The numerous modes of use that modern stroller designs attempt to satisfy have branched into several specialized areas of usefulness. Two primary fields of use are: Street or "urban" use, with an emphasis on light, compact and collapsible design; and "rural" or recreational and fitness/jogging/all-terrain use, with an emphasis on larger wheels and tripodal wheel configurations, to mitigate the effects of uneven or unpaved ground.

The present invention incorporates many of the super light and compact folding features of traditional "urban" stroller and buggy designs, with the durable and mobility enhancing advantages of the so-called "jogging" or "all-terrain" strollers, which are more suitable in suburban and rural environments, into a single unitary design. This Urban and All-Terrain Stroller not only brings these fields of use together, but also substantially improves vehicle performance in both it's urban/street and recreational/rural modes.

PRIOR ART

U.S. Pat. Nos. 4,953,880 (Sudakoff), 5,029,891 (Jacobs), 5,123,670 (Chen), 5,176,395 (Garforth-Bles), 5,224,720 (Chaw), 5,076,599 (Lockett), and 5,188,389 (Baechler), all embody three-wheeled strollers. All have chassis designs with similar support frameworks that define a rigid triangular or T-shaped structural "plane," parallel to the ground, the height or ground clearance of which is generally determined by the height of the wheel axis above the ground. They also have a solid axle, in the above-stated plane, along the axis generally defined by the two rear wheels.

These common features share distinct limitations: 1) the chassis' ground clearance is limited by the height of the wheel axis, necessitating a larger wheel to provide adequate ground clearance; 2) the total center of gravity of a seated child is moved upward, because all cross supports and framing must occur above the defining plane determined by the height of the wheel axis (necessitating a larger vehicle envelope, and a longer and/or broader "foot-print" of contact points with the ground, to achieve desired stability), and; 3) a solid, uninterrupted structural element or "axle" between the two rear wheels precludes the possibility of having all three wheels, in a collapsed mode, aligned along a single axis, which is most desirable for both maximal collapsing performance, and ease of mobility, transport and storage while stroller is collapsed.

While attempting to comprehensively address the very specific and narrow design considerations related to recreational, fitness, and "all-terrain" stroller use, these strollers actually do so in a way that limits their utility to their own specialty design niche, precluding practical use in all-purpose and/or urban applications. These strollers all incorporate similar design short-comings, with minor changes, evidencing a failure to embark on a comprehensive design revision and functional solution. That is what the preferred design of the present invention embodies.

OBJECTS AND ADVANTAGES

Accordingly, several objects and advantages of the present invention specifically address the broad failures of preexisting three-wheel designs, while incorporating numerous other functional advantages, briefing outlined as follows:

A higher ground clearance yet lowered center of gravity, provided by the improved chassis design, gains the additional advantage of allowing a smaller wheel size that is still large enough to mitigate the resistance of irregular ground. This uniquely raised wheel clearance allows 12" rear wheels, for example, to achieve the equivalent ground clearance of 26" rear wheels with a solid axle. Additionally, the lack of a rigid axle or framing member between the two rear wheels allows the front wheel, in collapsed mode, to align along the axis of the two rear wheels.

The major framing and support members in this vehicle define a set of four pivotally connected intersecting "planes," generally defined by the lateral symmetry of four key structural members: 1) the backrest/handle (1); 2) seatrest/frontwheel fork (2); 3) seatrest to rear wheel supports (5); and 4) backrest to rear wheel support (4), which collapse toward one another from a central pressure locking pivot point.

These pivotally connected intersecting 'planes' are structurally defined as: a) the backrest/handle 'plane' (part #1 FIG. 2), b) the seat-rest/front wheel fork 'plane' (part #2 FIG. 2), c) the backrest to rear wheel support 'plane' (part #4 FIG. 2), and d) the seat-rest to rear wheel support 'plane' (part #5 FIG. 2). When collapsed from a hand-operated locking and unlocking central pivot point, all of the above-defined "planes" collapse and align along generally compact parallel planes.

It has long been recognized that accidental collapse, and the scissoring and pinching action associated with collapsing strollers, are two of the most injury and liability prone aspects of all stroller designs, but very little has been done to comprehensively address these significant flaws.

Further, most strollers that can provide both upright and reclined seat positions do so in a way that necessitates moving the load center of gravity outward, usually toward the rear, increasingly moving the load weight away from the vehicle's and vehicle load's center of gravity. In the preferred embodiment of the present vehicle, the reclined position is achieved by shifting the child's weight slightly forward and down, increasing the vehicle and vehicle load stability by moving the weight further inside the vehicle envelope, and farther within the "footprint" of the three wheels.

In the preferred embodiment of the present invention, all pivot points, including the central locking pivot point, are cantilevered out of plane with at least one of any two intersecting support members, or the plane that they structurally define, eliminating all pinching/scissoring action at all pivot points.

The two central locking pivot-hinges which rotate and lock in 180° opposite positions, provides these unique advantages: 1) The collapsing action, rather than occurring downward from the central pivot, in the direction of gravity and thus the direction of a child's weight, occurs in an upward direction—against the child's weight and against the direction of gravity—minimizing the possibility of accidental collapse. And 2) the central locking pivot-hinge itself if cantilevered out of plane with the two primary intersecting structural planes generally defined by 1) the plane of the back-rest/handle and 2) the plane of the seat-rest/front fork, so that no scissoring or pinching action occurs at this hand operated (and therefore more pinch-prone) locking and unlocking pivot point.

Additionally, all wheel support members attached to the two above-mentioned "primary intersecting planes" collapse toward one another from cantilevered pivot points, eliminating all pinching/scissoring action due to converging support members when collapsing the stroller.

Several more advantages are achieved by an upwardly arched handle that allows the stroller to be gripped and steered at variable heights without any moving parts, so people of varying size can comfortably grip and steer the stroller.

Further, the arched handle, folding downward, ends up collapsed around the central wheel (within the space provided by the raised wheel clearance). It also functions as a fourth contact point with the ground, in collapsed mode, allowing the folded stroller to "free stand" in a generally vertical posture. This allows the stroller to take up minimal floor space during transport or storage. It also allows easy transport while the stroller is collapsed because it still "rolls" while being pushed or pulled by hand.

Also, cantilevered hand-braking action, usually applied to the front wheel (which as the forward-most braking point is most unstable) is applied from a single hand-brake lever to the two rear wheels simultaneously, for more stable uniform braking action, both while in motion, and while parked and in use as a safety brake.

In the preferred embodiment of the present invention, a cloth or nylon-like fabric is variously snapped or otherwise fastened to the framing members described herein, forming a flexible collapsible weight-bearing sling in which the seated child is held.

Further objects and advantages of this inventing will become apparent from a consideration of the drawings and ensuing description.

DESCRIPTION OF THE DRAWINGS

FIG. 5 shows a top view of the present invention

LIST OF REFERENCE NUMERALS

Figure 1:
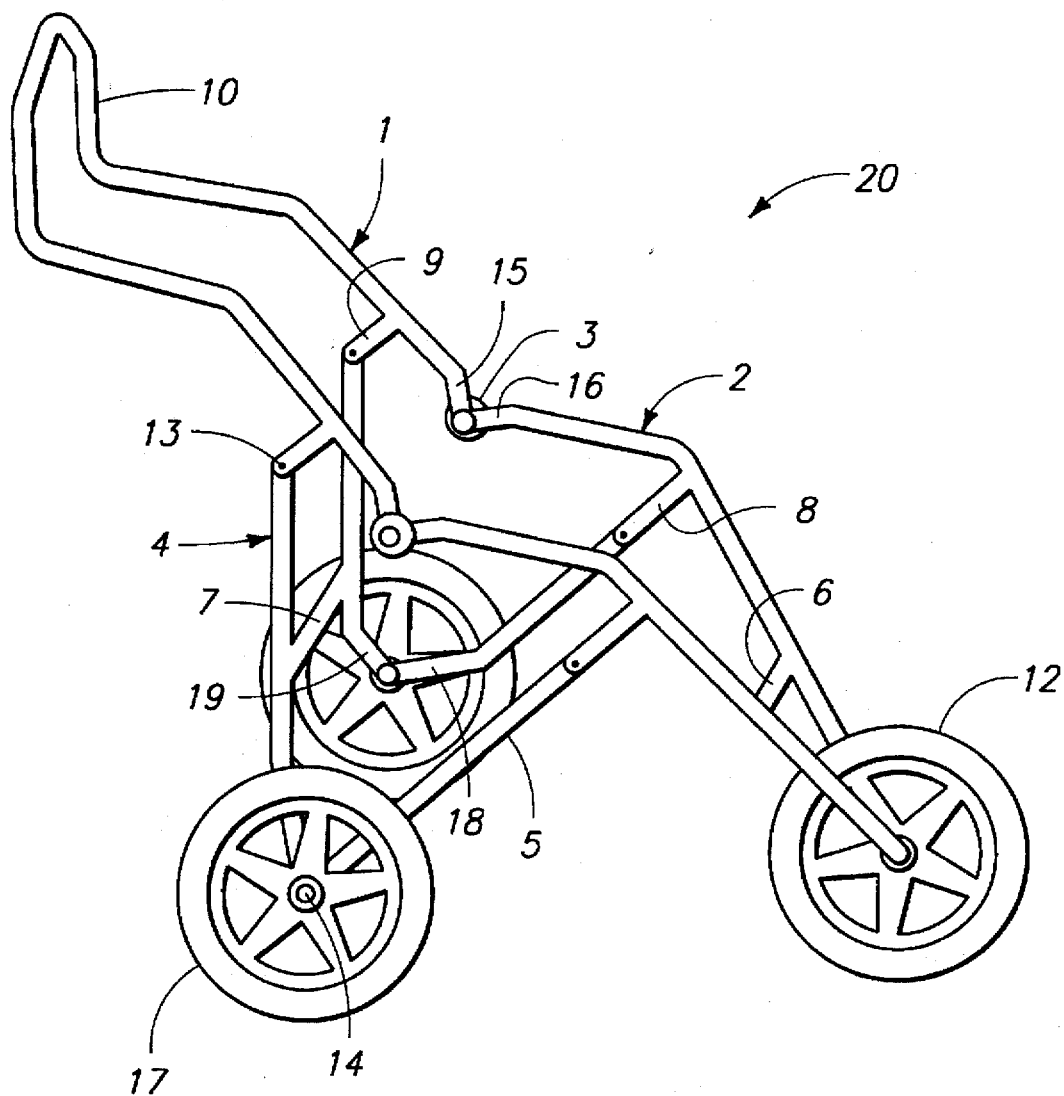
FIG. 1 shows a 3-dimensional view of the present invention

1) Backrest/handle (R&L)
2) seat-rest/front wheel fork (R&L)
3) locking central pivot hinge (R&L)
4) backrest to rear wheel support (R&L)
5) seat-rest to rear wheel support (R&L)
6) footrest cross-support
7) backrest cross-support
8) backrest pivot point extender (R&L)
9) seat-rest pivot-point extender (R&L)
10) upwardly arched handle
12) front wheel
13) seat-rest pivot point (R&L)
14) backrest pivot point (R&L)
15) central pivot point (R&L)
16) rear wheel pivot point (R&L)
17) anti-pinch backrest pivot bend (R&L)
18) anti-pinch seat-rest pivot bend (R&L)
19) rear wheels (R&L)
20) upright backrest position
21) reclined backrest position

DESCRIPTION OF THE INVENTION

Figure 2:
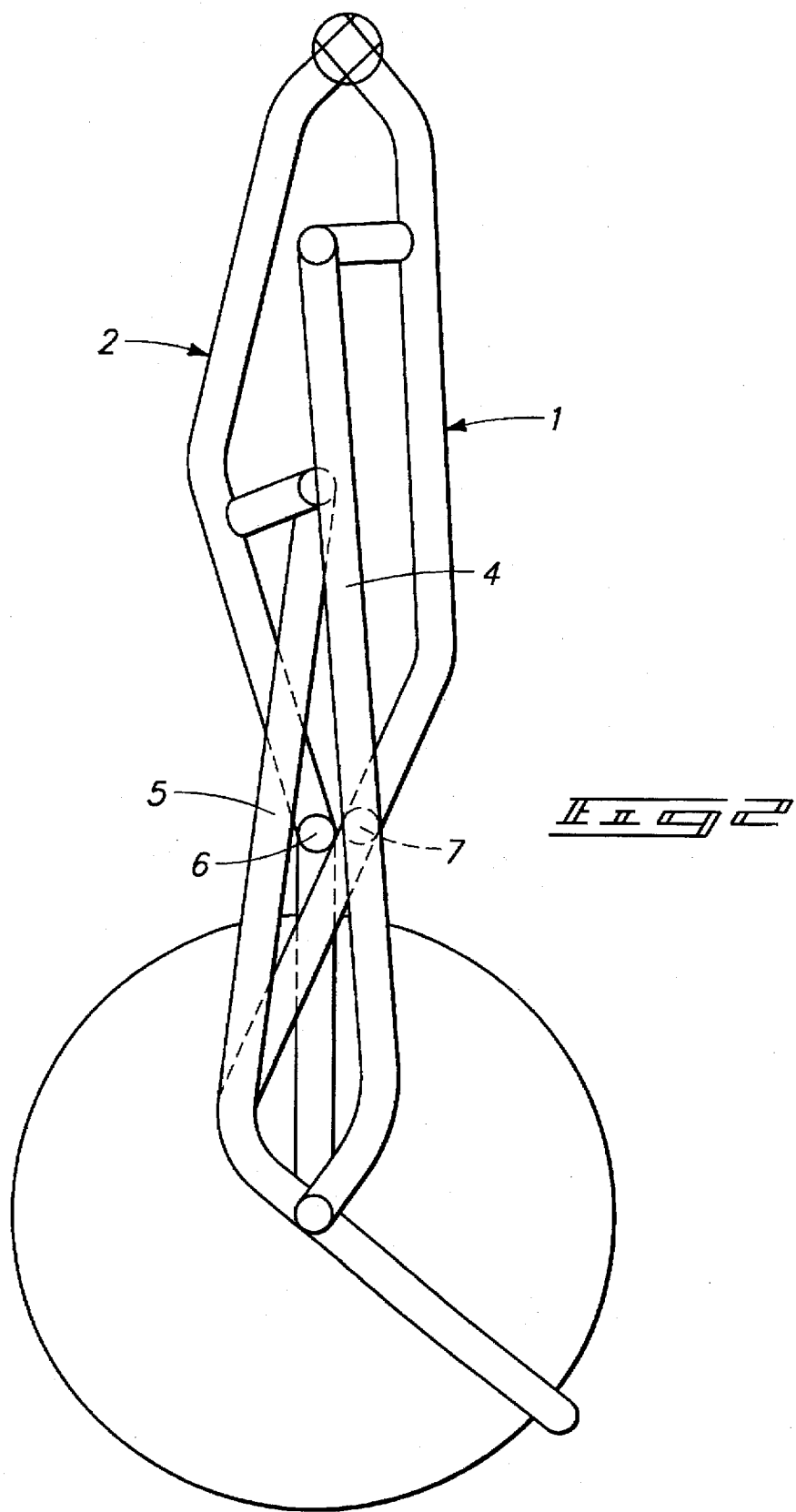
FIG. 2 shows a left side view of the collapsed stroller
Figure 3:
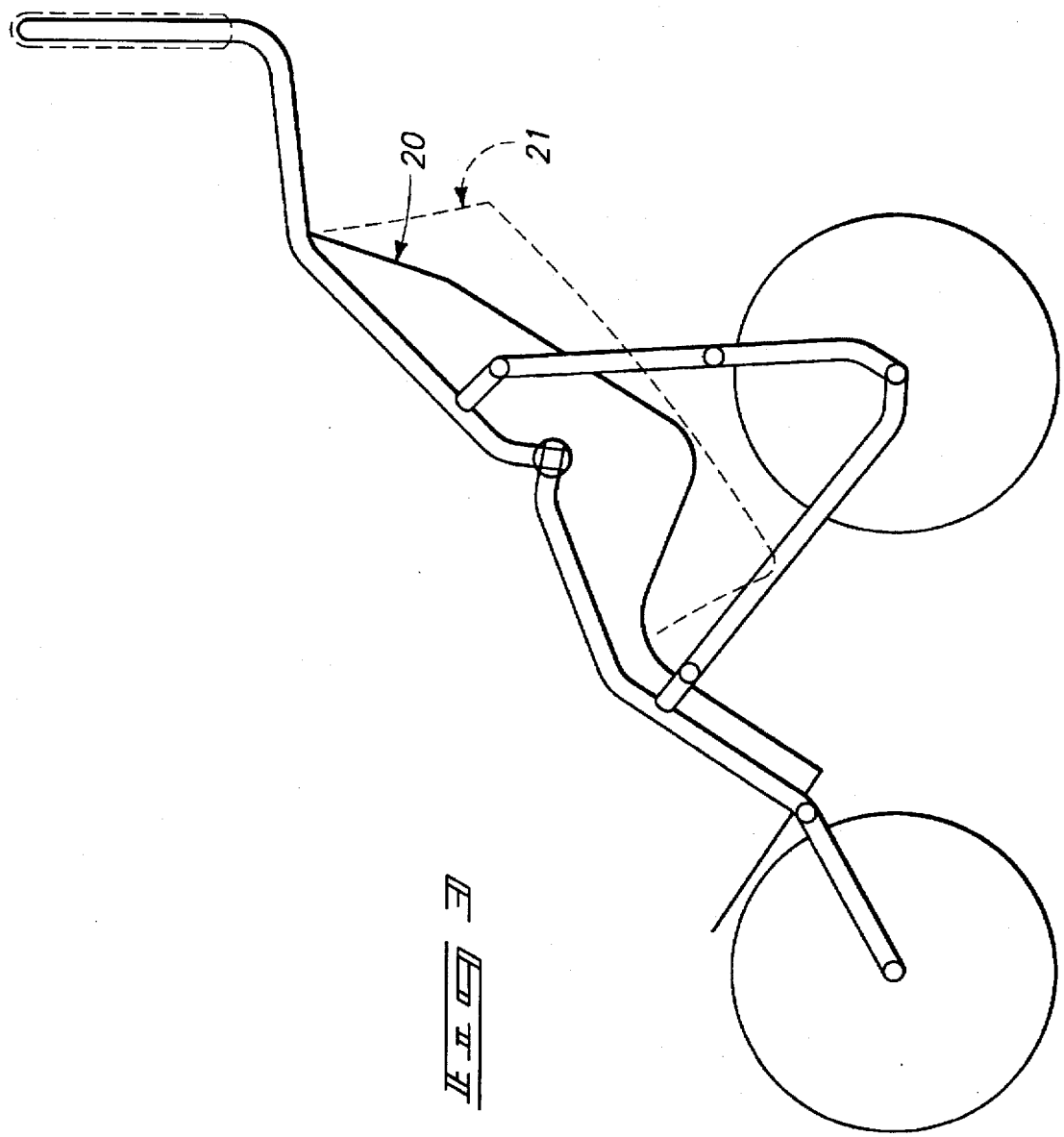
FIG. 3 shows a left side view of the present invention with upright and reclining positions defined relative to the stroller framework
Figure 4:
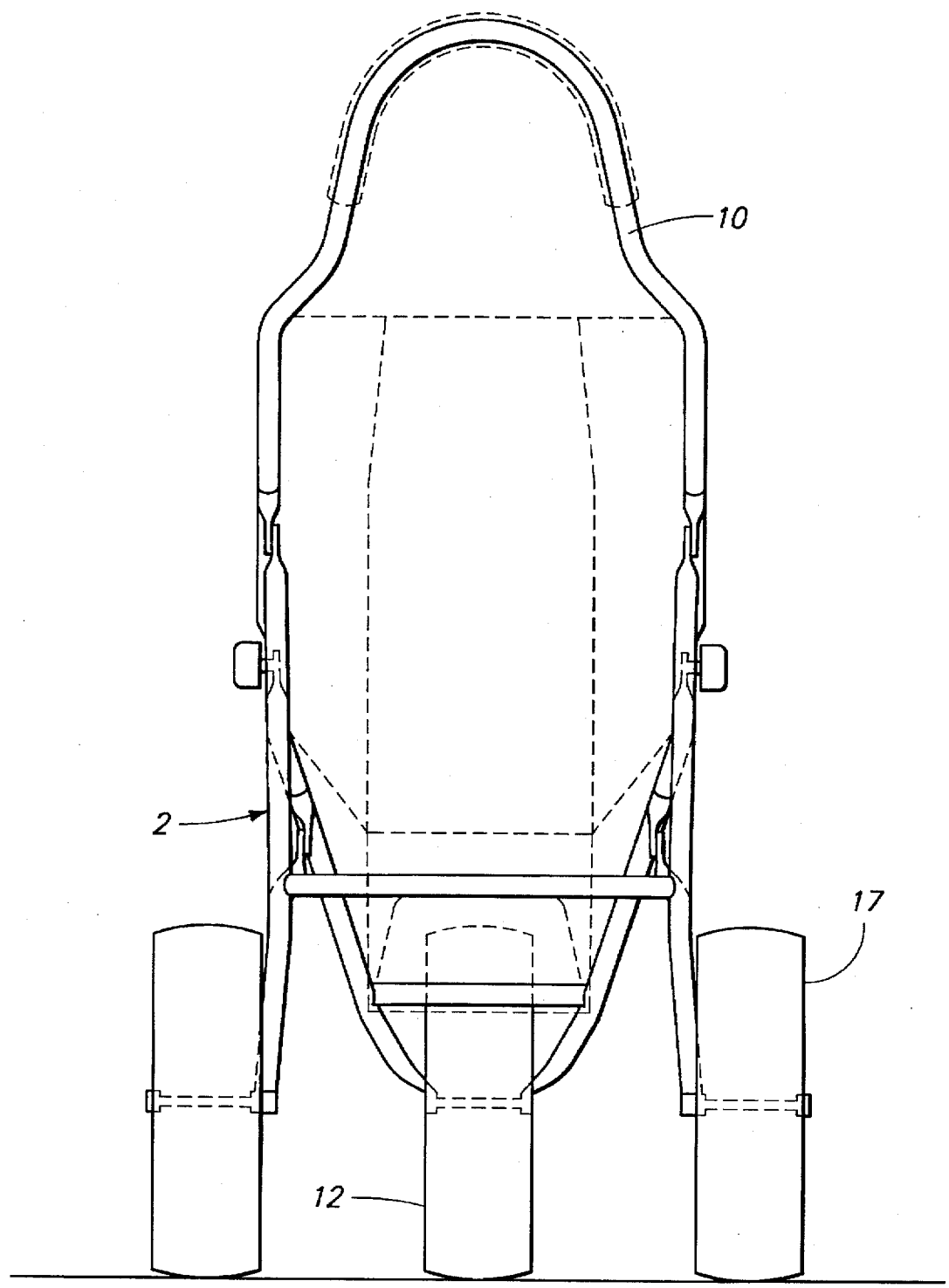
FIG. 4 shows a rear view of the present invention

FIGS. 1, 3, 4 and 5 show a preferred embodiment of the present invention in which the combination handle/backrest (1) is connected to the combination front wheel fork/seat-rest (2) by way of a locking central hinge (3). By releasing the locking pressure on the central pivot hinge, an upwardly-arched handle end (10) of backrest (1) folds downward toward rear-wheel supports (4), while combination front wheel/seat-rest supports (2) pivots upward at central pivot point (15) causing front wheel (12) to roll backwards between left and right rear wheels (19) beneath backrest cross-support (7), while arched handle (10) folds down to nest around front wheel (12) bringing all three wheels into alignment along a single axis (FIG. 2), with all main framing members (1,2,4, &5) folding toward one another until collapsed along generally single or closely aligned parallel planes, as illustrated by the side view in FIG. 2, with upwardly-arched handle end (10) nestled around front wheel (12) beneath backrest cross-support (7).

Conclusions, Ramifications, and the Scope of the Invention

While the description above contains many specifications, these should not be construed as limitations on the scope of the invention, but rather as an exemplification of the initially preferred embodiment thereof. Many other variations are possible.

For example, a stroller with four or more wheels could be made based on the same basic folding chassis design, with two or more forward wheels that fold back into alignment with the rear wheels. Or, an optional attachment to the front fork could extend the forward axis laterally to the right and left, for additional forward lateral stability. The three wheel version herein simply represents the preferred embodiment of numerous potential versions that are claimed within the scope of the present invention.

For instance, in another embodiment of the present invention, a rigidly molded plastic or other solid seat may be removably mounted within the framework provided by the above described folding chassis, to function interchangeably as a carseat. Other related modifications, adapting this basic design for use by disable persons, are also well within the scope of the present invention.

Accordingly, the scope of the invention should be determined not by the embodiments illustrated, but by the appended claims and their legal equivalents.

I claim:

1. A collapsible stroller comprising a rearward frame having foremost and rearmost portions, hingedly connected at central collapsing axis points to a forward frame having foremost and rearmost portions, a portion of said forward frame hingedly connected to the upper portion of downwardly inclined rear wheel supports, the lower portion of said wheel supports pivotally intersecting with the axis of rear wheels, a portion of said rearward frame hingedly connected to the upper portion of downwardly inclined rear wheel supports, the lower portion of said wheel supports pivotally intersecting with the axis of rear wheels, foremost portions of said rearward frame and rearmost portions of said forward frame engaged for collapse at said hingedly connected central collapsing axis pivot toward one another at said central collapsing axis as upper portions of said downwardly inclined wheel supports hingedly connected to portions of said forward and rearward frames and lower portions of said downwardly inclined rear wheel supports pivotally intersecting with the axis of rear wheels engaged for collapse by said hingedly connect said rear collapsing axis pivot toward one another at said rear wheel until said rearward and forward frames and said rear wheel supports are superimposed with and substantially folded flat against one another wherein during collapse said forward frame with at least one wheel pivots rearward and upward into a vertical posture as the rearward frame to which said forward frame is hingedly connected at said central folding axis folds downward and forward into a vertical posture with central portions of the said forward and said rearward frames pivoting upward relative to their points of hinged attachment to their respective rear wheel supports such that the action of collapse relative to the central collapsing axis in relation to the ground is upward and against the weight of a seated child and thus against the direction of accidental collapse.

2. A collapsible stroller comprising a rearward frame having foremost and rearmost portions, hingedly connected at central collapsing axis points to a forward frame having foremost and rearmost portions, a portion of said forward frame hingedly connected to the upper portion of downwardly inclined rear wheel supports, the lower portion of said wheel supports pivotally intersecting with the axis of rear wheels, a portion of said rearward frame hingedly connected to the upper portion of downwardly inclined rear wheel supports, the lower portion of said wheel supports pivotally intersecting with the axis of rear wheels, foremost portions of said rearward frame and rearmost portions of said forward frame engaged for collapse at said hingedly connected central collapsing axis pivot toward one another at said central collapsing axis as upper portions of said downwardly inclined wheel supports hingedly connected to portions of said forward and rearward frames and lower portions of said downwardly inclined rear wheel supports pivotally intersecting with the axis of rear wheels engaged for collapse by said hingedly connected central collapsing axis pivot toward one another at said rear wheel until said rearward and forward frames and said rear wheel supports are superimposed with and substantially folded flat against one another wherein hand activated collapse at said central folding axis swings said forward frame and front wheel rearward, while the rearward frame and steering handle swing downward and forward, between said forward and said rearward frames all said forward and rearward wheel supports mutually and coactively collapse toward one another, until all said frame members are substantially flat and compactly collapsed in relation to one another with all said wheels aligned along a single axis and said wheels substantially disposed on one end of the collapsed frame, allowing wheeled transport of collapsed stroller.

\* \* \* \* \*